Feb. 11, 1975 G. C. NORDEEN Re. 28,331

FISHING APPARATUS

Original Filed May 11, 1971 3 Sheets-Sheet 1

GERALD C. NORDEEN
INVENTOR

BY: Lowell Everett
ATTORNEY

George L. Brehm
AGENT

FISHING APPARATUS

Original Filed May 11, 1971 3 Sheets-Sheet 2

GERALD C. NORDEEN
INVENTOR

BY: Jurcalup Burrell
ATTORNEY

George L. Brehm
AGENT

FISHING APPARATUS

Original Filed May 11, 1971 3 Sheets-Sheet 3

GERALD C. NORDEEN
INVENTOR
BY
ATTORNEY
George L. Brehm
AGENT

United States Patent

Re. 28,331
Reissued Feb. 11, 1975

28,331
FISHING APPARATUS

Gerald C. Nordeen, 1612 Victoria Park Road
Fort Lauderdale, Fla. 33305

Original No. 3,698,121, dated Oct. 17, 1972, Ser. No. 142,311, May 11, 1971. Application for reissue Oct. 17, 1973, Ser. No. 407,233
Int. Cl. A01k *93/00*
U.S. Cl. 43—43.14 3 Claims

Matter enclosed in heavy brackets [ ] appears in the original patent but forms no part of this reissue specification; matter printed in italics indicates the additions made by reissue.

ABSTRACT OF THE DISCLOSURE

A fishing apparatus having a buoyant float assembly consisting of a container and an inflated lighter than air balloon to be positioned over a fishing area, the container adapted to be initially filled with water to render the float assembly sufficiently buoyant as to float on water; the float assembly having a conventional depending fishhook and having a hollow flexible tube forming a line adapted to be carried upon a reel having one end attached to the container thereof and connected to a fishing pole, a source of inert gas under pressure in the fishing pole and valve means on the fishing pole to manually release the gas through the hollow tube and into the container to force the water therefrom and thus lighten the float sufficiently to cause the balloon portion to lift the container, the attached hook and any fish which may be caught thereon, to a point adjacent the surface of the water, whereby the fisherman may reel in his catch.

This invention relates to fishing apparatus generally of the rod and reel type but having an unconventional float which enables the fisherman to lift the caught fish vertically to the top of the water regardless of how far from the float the fisherman is and thereafter bring or reel the hooked fish in while the inflated balloon keeps the hook taut in the fish's mouth.

It is one object of the present invention to produce a fishing apparatus having a novel manner of lifting the caught fish to the surface of the water.

It is another object to produce such a fishing apparatus which will not be too expensive to manufacture.

It is still another object to produce such an apparatus which will be reliable in operation and because of its novel and unusual function will stimulate interest in the sport of fishing.

These and other objects and advantages of the device will become more apparent as this description proceeds and specific reference is had to the accompanying drawing forming a part of this specification and in which.

Figure 1:
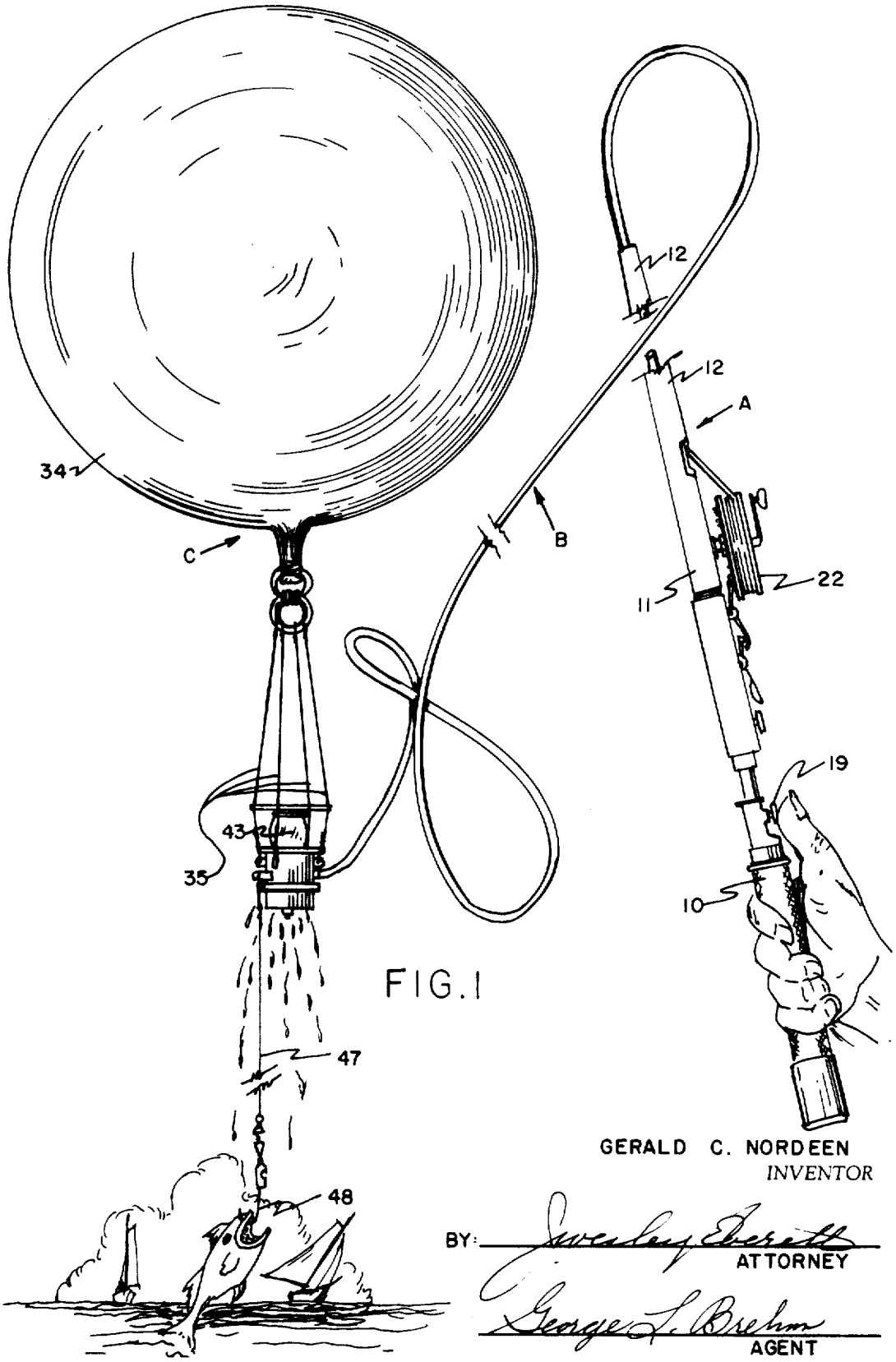
FIG. 1 is a side elevational view of a fishing apparatus according to my invention.
Figures 2, 3, 4, 5, 6, 7, 8:
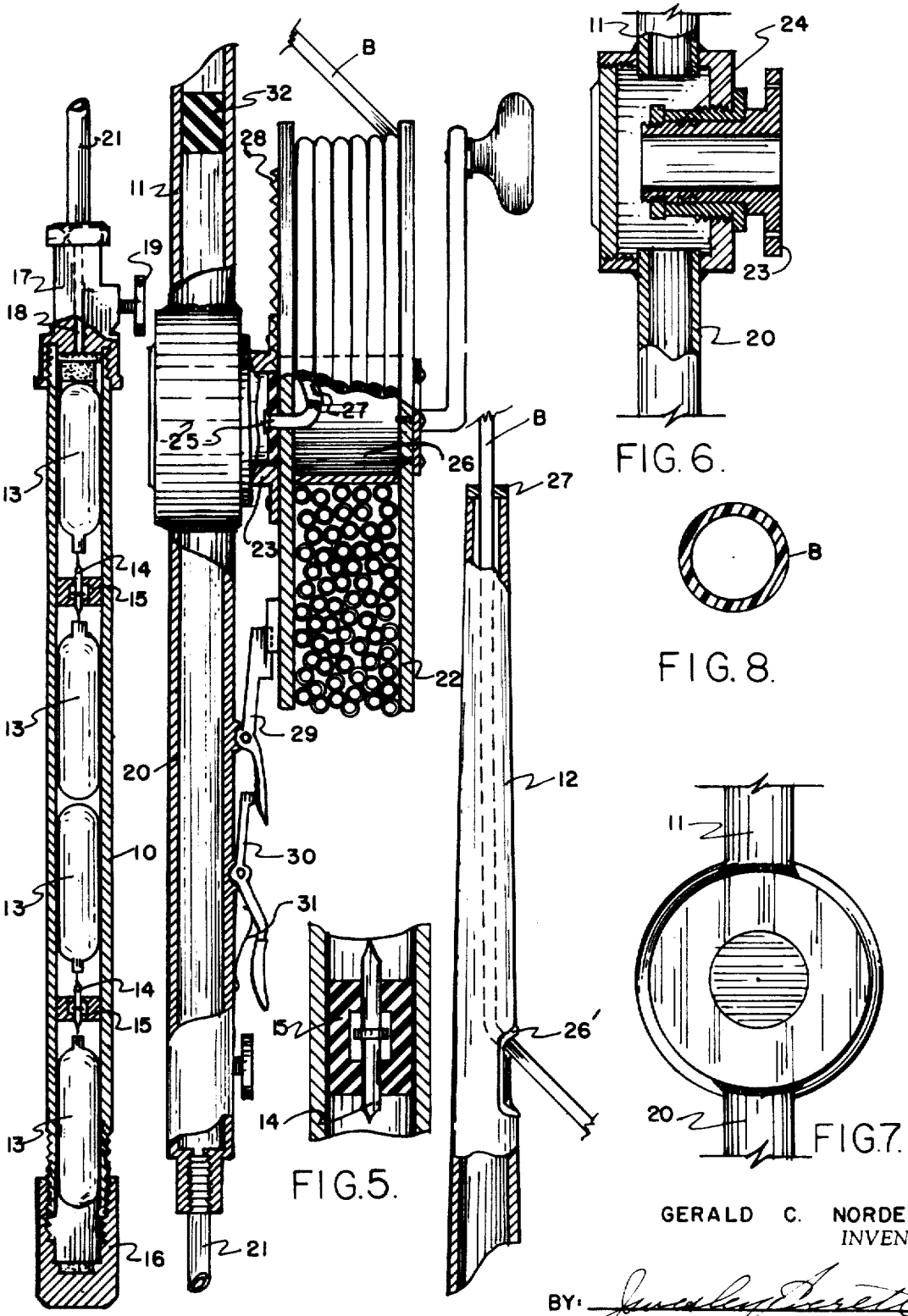
FIG. 2 is a fragmentary sectional view of the end or handle portion of the rod showing the arrangement of gas capsules contained therein.
FIG. 3 is a fragmentary sectional view of the reel section of the rod.
FIG. 4 is a fragmentary view partly in section of the upper end portion of the rod showing the hollow line or tube fed therethrough.
FIG. 5 is a detail sectional view of the handle section of the rod showing the puncturing means for the gas capsules.
FIG. 6 is an enlarged sectional view of the supporting means for the reel.
FIG. 7 is a top plan view of the same.
FIG. 8 is an enlarged sectional view of the hollow fishing line.

Referring more in detail to the drawing and particularly to FIG. 1 thereof, the apparatus consists of three main components, the rod A, the line B, and the float assembly C.

Details of the rod A are shown in FIGS. 2, 3, 4, 5, 6, and 7 and reference to these figures is now had. The rod comprises a handle section 10, a reel section 11, and the hollow terminal end section 12.

The handle section 10 is of hollow tubular construction and is of such size as to form a container for a number of gas capsules 13. These capsules are of the type containing gas under pressure such as carbon dioxide and are readily available in stores everywhere as they are of the type frequently used in home appliances for carbonating water or beverages. In order to puncture the capsules, double pointed pins 14 slidably mounted in guides 15 (shown in detail in FIG. 5) are located between adjacent capsules and any conventional means to force the capsules against the pins, for example, screwing the end cap 16 against the end capsule would cause the pins to puncture the capsules and release the gas into the space in the hollow handle 10, In order to contain the gas in the handle the upper end of handle in provided with a second cap 17 which is hollow at 18 and has a valve 19 therein. The valve 19 forms a ready means to release some of the gas through the passage 18 when desired, as will hereinafter be described.

The reel section of the rod comprises a tubular portion 20 which is connected to the handle section *10* by a small rod section 21 which is hollow and forms a communication between the handle portion through passage 18 and the tubular portion 20 and may be somewhat flexible and resilient to give the rod a certain amount of "whip."

A reel 22 is provided with a trunnion 23 and this trunnion serves to mount the reel on the side of the tubular portion 20 on suitable low friction bearings 24 to insure free rotation of the reel on the portion 20.

The trunnion 23 is hollow and a tubular member 25 extends from the hollow interior of the trunnion through the core 26 of the reel in position to receive the end 27 of a flexible tube or "hollow line" wrapped about the reel and which forms the line B previously described. It can be readily seen that the construction previously described affords passage of a gas or fluid from the interior of the handle 10 through the hollow section of rod 21, through the interior of the tubular portion 20, through the trunnion 23, tubular member 25 and into the hollow line B. This flow of course can be controlled by valve 19.

The end of the hollow line B from the reel is fed through a guide opening 26 in the side of the upper portion 12 of the rod and out through the guide 27 in the end thereof to be connected to the float assembly hereinafter described.

The reel may, if desired, be provided with a suitable "drag" mechanism 28, 29, 30 and 31, but its inclusion or omission is not considered of basic importance.

In order to seal the reel section 11 of the rod from the upper terminal end section 12, a plug or closure 32 is placed between the sections.

Figure 9:
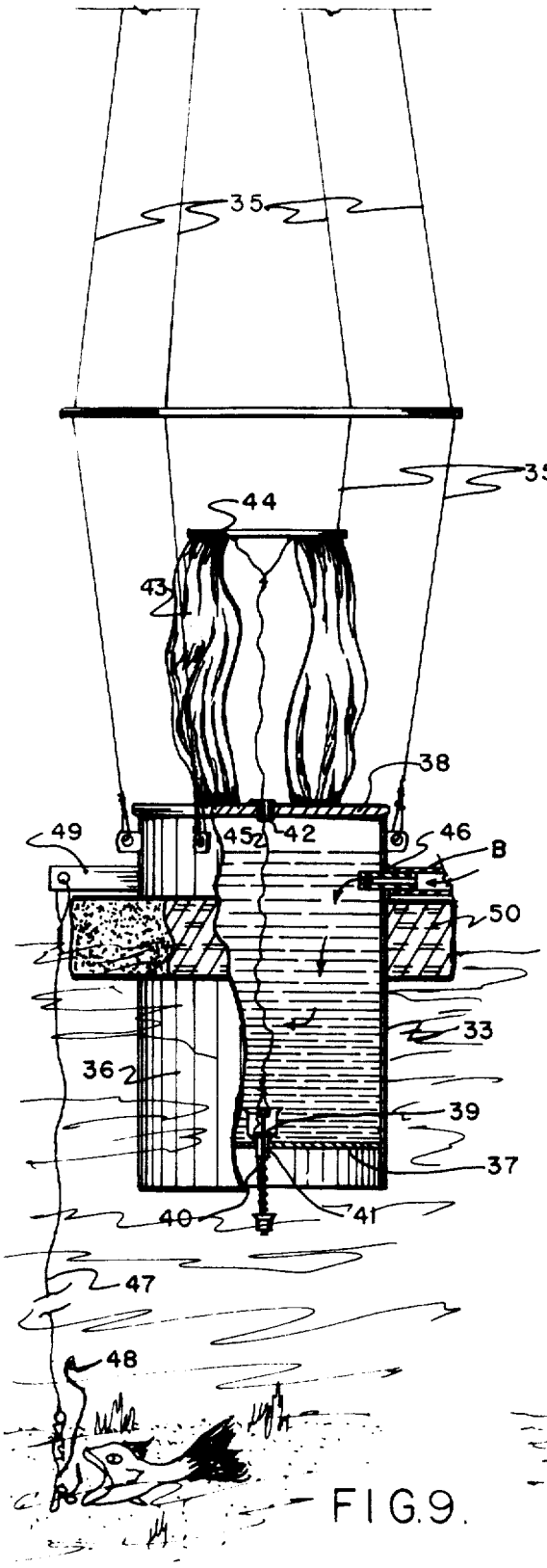
FIG. 9 is a side elevation, partly in section, of the container portion of the float assembly when filled with water.
Figure 10:
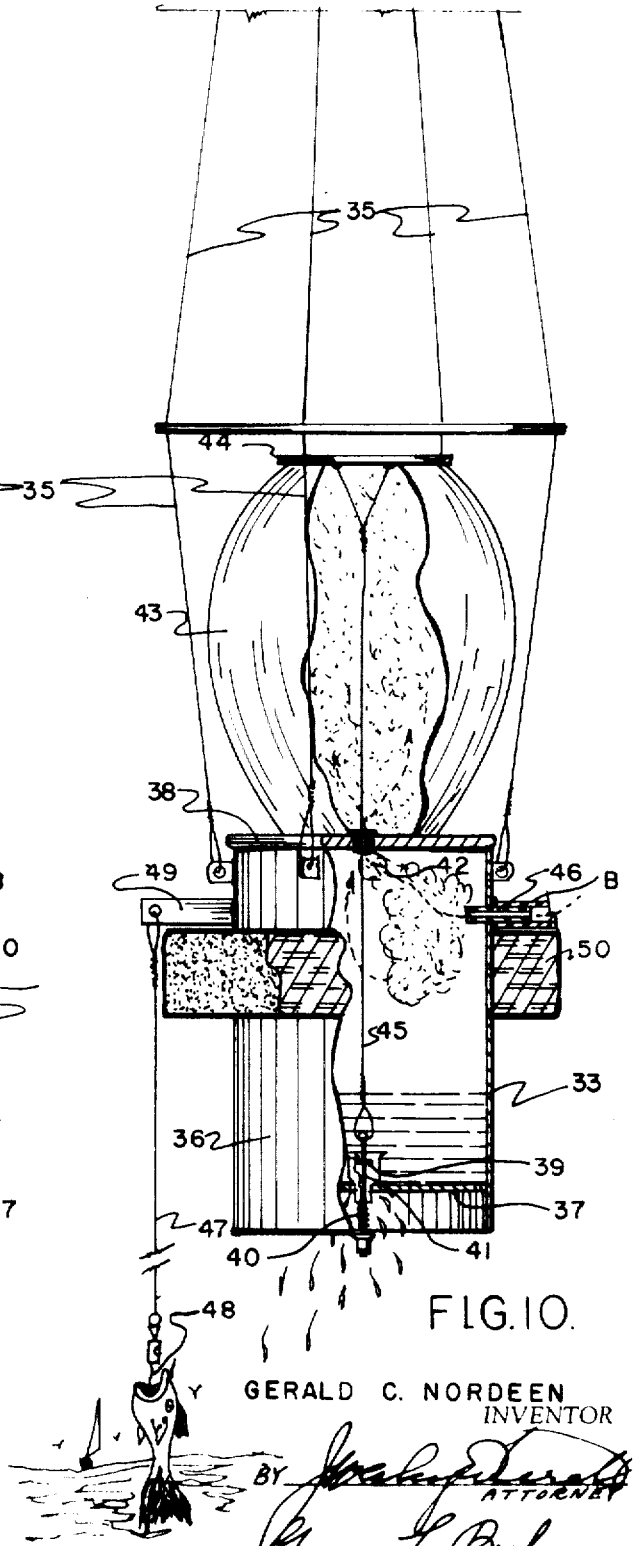
FIG. 10 is a view similar to FIG. 9 showing the container portion when empty.

The float assembly C is shown in detail in FIGS. 9 and 10 and comprises two main portions, a container portion 33 and a balloon 34 connected by a bail structure 35. The balloon is a conventional rubber or plastic balloon similar to the well known "weather balloons" and is inflated with lighter than air gas, such as helium or hydrogen.

The container portion may be described as a can with cylindrical side walls 36, a bottom wall 37 and a top wall 38.

The bottom wall has a lift valve 39 normally held closed by a light spring 40 around the valve stem 41 but which may be opened by an upward pull on the valve stem.

The top 38 of the container is provided with an opening 42 while above the top 38 and having one end sealed thereto is a flexible bag 43 having an end disc or top 44 sealed thereto so that the only communication to the interior of the bag is through the opening 42.

A flexible cord 45 or the like is connected to the top 44 of the bag and extends down through the opening 42 and connects to the lift valve 39 and is of such length that when the top 44 is in its uppermost position, as when the bag 43 is inflated, it will lift the valve 39 from its seat and open the container 33.

A side port 46 is provided near the top of the container and the hollow line B is connected thereto.

A leader 47 with the usual hook 48, etc. is connected to the container in any suitable manner at 49.

Surrounding the container 33 is a float 50 which allows the container to only be submerged to a predetermined depth.

The operation of the device is as follows:

The leader, hook, etc., with its bait will be submerged. The fisherman feeds out the hollow line and depends on the wind to carry the float assembly away from the boat, dock or other point at which he is stationed. The float assembly may be fed to any distance away from the fisherman, limited only by the length of the hollow line.

The container 33 is filled with water *through the hollow line* to the extent to allow the container to settle on the water up to the float ring 50. Of course, the gas filled balloon will cause an upward pull on the container at all times but not enough to lift the water filled container out of the water. When a bite is detected, by agitation of the float, the fisherman merely opens the valve 19 on the rod handle. This will allow the gas under pressure stored in the handle to pass through the hollow line B and through the port 46 in the container. The gas will then inflate bag 43 to the position shown in FIG. 10 and will open valve 39 and allow the water in the container to escape. Having lost its water the container will no longer be heavy enough to hold the float assembly on the water but due to the lift of the balloon the entire float assembly will be lifted out of the water and into the air urging the catch, if one is on the hook, toward the top of the water. The fisherman may then reel in his catch.

Having described a preferred embodiment of my invention, what I claim as new is:

1. A fishing apparatus comprising:

(a) a rod;

(b) a float, said float having means thereon extending downwardly therefrom and adapted to carry a fish lure and catching means thereon;

(c) means incorporated in the float for varying the weight thereof from a maximum wherein the float will rest upon the water, to a minimum wherein the float will become lighter than air and be lifted from the water;

(d) a line connecting the rod and the float; and (e) means on the rod and operable through the line for changing the weight of the float.

2. The fishing apparatus defined in Claim 1 in which the float comprises a container adapted to hold water and a lighter-than-air balloon and the means for varying the weight of the float comprises a valve in the container to allow escape of the water therefrom and thereby lighten the weight of the float.

3. The fishing apparatus defined in Claim 2 in which the line connecting the rod and float is a hollow tube and the means on the rod to change the weight of the float is a supply of gas, under pressure with means operable from the rod for releasing the gas through the hollow tube, and valve actuating means on the container responsive to the gas pressure through the hollow tube to open the valve and force escape of water therefrom.

References Cited

The following references, cited by the Examiner, are of record in the patented file of this patent or the original patent.

UNITED STATES PATENTS

| | | | |
|---|---|---|---|
| 3,246,417 | 4/1966 | Esplin | 43—43.14 |

FOREIGN PATENTS

| | | | |
|---|---|---|---|
| 677,900 | 12/1929 | France | 43—43.14 |

WARNER H. CAMP, Primary Examiner